(12) United States Patent
Fedurco et al.

(10) Patent No.: US 9,845,376 B2
(45) Date of Patent: *Dec. 19, 2017

(54) POLYUREA THAT IS PARTICULARLY USEFUL AS AN ADHESION PRIMER FOR ADHERING METAL TO RUBBER

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Milan Fedurco, Clermont-Ferrand (FR); Marco Ribezzo, Clermont-Ferrand (FR); Antonio Delfino, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

(*) Notice: Subject to any disclaimer, the term of this patent is extended or adjusted under 35 U.S.C. 154(b) by 0 days.

This patent is subject to a terminal disclaimer.

(21) Appl. No.: 14/438,382

(22) PCT Filed: Oct. 16, 2013

(86) PCT No.: PCT/EP2013/071579
§ 371 (c)(1),
(2) Date: Apr. 24, 2015

(87) PCT Pub. No.: WO2014/063963
PCT Pub. Date: May 1, 2014

(65) Prior Publication Data
US 2015/0259463 A1    Sep. 17, 2015

(30) Foreign Application Priority Data

Oct. 24, 2012  (FR) ..................................... 12 60100
Apr. 26, 2013  (FR) ..................................... 13 53815

(51) Int. Cl.
C08G 18/76 (2006.01)
B60C 1/00 (2006.01)
(Continued)

(52) U.S. Cl.
CPC ......... *C08G 18/7657* (2013.01); *B29D 30/48* (2013.01); *B60C 1/00* (2013.01);
(Continued)

(58) Field of Classification Search
CPC .... C07C 323/34; C07C 323/35; C07C 323/36
(Continued)

(56) References Cited

U.S. PATENT DOCUMENTS 4,757,119 A * 7/1988 Wiggins ............... C08G 59/504
525/504
4,777,187 A    10/1988 Weber et al. ................... 521/51
(Continued)

FOREIGN PATENT DOCUMENTS

CN    102625815 A    8/2012
JP    48-25792 A    4/1973
(Continued)

OTHER PUBLICATIONS

International Search Report dated Jun. 24, 2014, issued by EPO in connection with International Application No. PCT/EP2013/071579.
(Continued)

*Primary Examiner* — Mike M Dollinger
(74) *Attorney, Agent, or Firm* — Fitzpatrick, Cella, Harper & Scinto

(57) ABSTRACT

A polyurea comprises at least urea base units of formula —NH—CO—NH— and additional units. The additional units comprise at least, on the one hand, a secondary alcohol functional group and, on the other hand, an ether, thioether or secondary amine functional group in the alpha position
(Continued)

(I)

Figure 1:
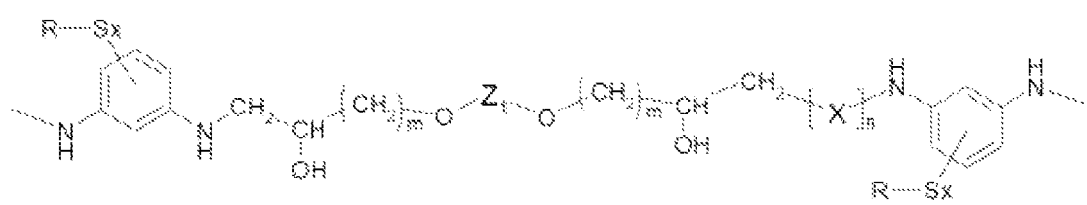
Figure 1:
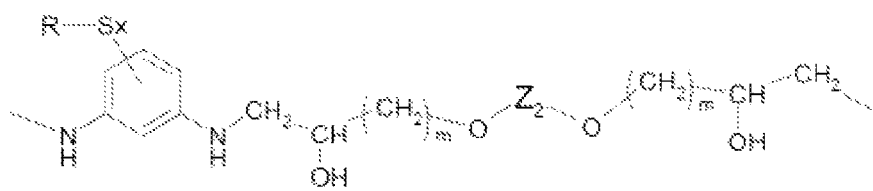

X:

with respect to the secondary alcohol functional group. Such a polymer can be used as an adhesion primer for the adhesive bonding of a substrate, for example, glass or metal, to an unsaturated rubber or as corrosion-resistant protective coating for a metal substrate. Metal reinforcers, such as thread, cord, film or plate, coated can also be coated with such a polymer.

26 Claims, 9 Drawing Sheets

(51) Int. Cl.
  *C08G 18/64*  (2006.01)
  *C08G 18/79*  (2006.01)
  *C08G 18/80*  (2006.01)
  *C08G 18/09*  (2006.01)
  *C08G 18/18*  (2006.01)
  *C09D 175/02*  (2006.01)
  *C08G 18/38*  (2006.01)
  *C09J 175/02*  (2006.01)
  *B29D 30/48*  (2006.01)
  *C08G 18/32*  (2006.01)
  *C09D 5/08*  (2006.01)
  *B29D 30/38*  (2006.01)
  *B60C 9/00*  (2006.01)

(52) U.S. Cl.
  CPC ....... *C08G 18/092* (2013.01); *C08G 18/1816* (2013.01); *C08G 18/3228* (2013.01); *C08G 18/3868* (2013.01); *C08G 18/643* (2013.01); *C08G 18/6453* (2013.01); *C08G 18/797* (2013.01); *C08G 18/8074* (2013.01); *C09D 5/08* (2013.01); *C09D 175/02* (2013.01); *C09J 175/02* (2013.01); *B29D 2030/383* (2013.01); *B29D 2030/483* (2013.01); *B60C 2009/0014* (2013.01); *C08G 2105/02* (2013.01); *C08G 2150/90* (2013.01); *C08G 2380/00* (2013.01); *Y10T 428/12569* (2015.01); *Y10T 428/31725* (2015.04)

(58) Field of Classification Search
  USPC ...................................................... 428/423.1
  See application file for complete search history.

(56) References Cited

U.S. PATENT DOCUMENTS

| | | | |
|---|---|---|---|
| 5,124,426 A * | 6/1992 | Primeaux, II | C08G 18/3868 528/60 |
| 5,525,681 A | 6/1996 | Barron et al. | 525/403 |
| 5,534,036 A * | 7/1996 | Junino | A61K 8/411 8/406 |
| 6,723,821 B2 | 4/2004 | Smith | 528/62 |
| 7,432,399 B2 * | 10/2008 | Verborgt | C07C 217/28 564/305 |
| 2002/0183450 A1 | 12/2002 | Smith | 525/107 |
| 2010/0021676 A1 | 1/2010 | Laubry | 428/63 |
| 2010/0210745 A1 * | 8/2010 | McDaniel | C09D 5/008 521/55 |
| 2011/0039982 A1 | 2/2011 | Hefner, Jr. et al. | 523/400 |
| 2012/0097194 A1 * | 4/2012 | McDaniel | A01N 63/02 134/26 |
| 2012/0157620 A1 | 6/2012 | Nagy et al. | 524/612 |
| 2013/0079485 A1 * | 3/2013 | Cai | C08G 18/52 528/55 |
| 2014/0315898 A1 * | 10/2014 | Koehler | A01N 41/10 514/227.2 |

FOREIGN PATENT DOCUMENTS

| | | |
|---|---|---|
| JP | 48-41927 B | 12/1973 |
| JP | 63-199722 A | 8/1988 |
| JP | 3-109416 A | 5/1991 |
| JP | 3-220221 A | 9/1991 |
| JP | 4-189813 A | 7/1992 |
| JP | 5-43864 A | 2/1993 |
| JP | 8-503518 A | 4/1996 |
| WO | 2008/051229 A1 | 5/2008 |

OTHER PUBLICATIONS

Preliminary Report on Patentability dated Jul. 2, 2013, issued by the French Patent Office in connection with French Application No. 1260100.

Prelimimary Report on Patentability dated Oct. 16, 2013, issued by the French Patent Office in connection with French Application No. 1353815.

Fedurco, U.S. Appl. No. 14/438,396, filed Oct. 16, 2013.

* cited by examiner (II)

X:

(II-A)

(II-B)

(II-C)

(II-D)

Polyurea 1

Monomer C1

170 °C

Monomer D

Polyurea 1

Polyurea 2

US 9,845,376 B2

POLYUREA THAT IS PARTICULARLY USEFUL AS AN ADHESION PRIMER FOR ADHERING METAL TO RUBBER

1. FIELD OF THE INVENTION

The present invention relates to polymers comprising urea units, or polyureas, which can be used in particular in adhesive systems intended especially for the adhesive bonding of metal or glass to rubber.

It more particularly relates to polyureas which can be used as adhesion primers in metal/rubber composites intended for the manufacture of articles made of rubber, such as tyres.

2. PRIOR ART

Metal/rubber composites, in particular for tyres, are well known. They are generally composed of a matrix made of unsaturated rubber, generally diene rubber, which can be crosslinked with sulphur, comprising metal reinforcing elements (or "reinforcers") such as threads, films or cords made of carbon steel.

As they are subjected to very high stresses during the rolling of the tyres, in particular to repeated actions of compression, bending or variation in curvature, these composites must, in a known way, satisfy a large number of sometimes contradictory technical criteria, such as uniformity, flexibility, endurance in bending or compression, tensile strength, wear resistance and corrosion resistance, and must maintain this performance at a very high level for as long as possible.

It is easily understood that the adhesive interface between rubber and reinforcers plays a dominating role in the persistence of this performance. The conventional process for connecting the rubber compositions to carbon steel consists in coating the surface of the steel with brass (copper/zinc alloy), the bonding between the steel and the rubber matrix being provided by sulphurization of the brass during the vulcanization or curing of the rubber. In order to improve the adhesion, use is generally made, in addition, in these rubber compositions, of organic salts or metal complexes, such as cobalt salts, as adhesion-promoting additives.

In point of fact, it is known that the adhesion between the carbon steel and the rubber matrix is capable of weakening over time as a result of the gradual development of sulphides formed under the effect of the various stresses encountered, in particular mechanical and/or thermal stresses, it being possible for the above decomposition process to be accelerated in the presence of moisture.

Moreover, the use of cobalt salts renders the rubber compositions more sensitive to oxidation and to ageing, and significantly increases the cost thereof, not to mention that it is desirable to eliminate, in the long run, the use of such cobalt salts in rubber compositions due to recent developments in European regulations relating to metal salts of this type.

For all the reasons set out above, manufacturers of metal/rubber composites, in particular tyre manufacturers, are on the lookout for novel adhesive solutions in order to adhesively bond metal reinforcers to rubber compositions, while overcoming, at least in part, the abovementioned disadvantages.

3. BRIEF DESCRIPTION OF THE INVENTION

In point of fact, during their research studies, the Applicant Companies have found a novel polymer of the polyurea type, having a specific formula, which meets such an objective.

Consequently, the invention relates to a polyurea comprising at least urea base units of formula —NH—CO—NH— and additional units, characterized in that these additional units comprise at least, on the one hand, a secondary alcohol functional group and, on the other hand, an ether, thioether or secondary amine functional group in the alpha position with respect to the secondary alcohol functional group.

The metal reinforcers thus coated with the polymer according to the invention, as adhesion primer, exhibit the major advantage of being able subsequently to be adhesively bonded to unsaturated rubber matrixes using simple textile adhesives, such as "RFL" (resorcinol/formaldehyde latex) adhesives or other equivalent adhesive compositions, or also directly (that is to say, without employing such adhesives) to these unsaturated rubber matrices when the latter comprise, for example, appropriate functionalized unsaturated elastomers, such as epoxidized elastomers.

By virtue of the invention, use may be made of metal reinforcers coated or not coated with adhesive metal layers, such as brass, and also surrounding rubber matrices devoid of metal salts, in particular of cobalt salts.

The invention also relates to the use of the polymer according to the invention as adhesion primer for the adhesive bonding of any substrate, in particular of metal, such as iron or zinc, or also of glass, to an unsaturated rubber, such as, in particular, a diene elastomer.

As the polymer of the invention has furthermore displayed hydrophobic properties, the coating provided exhibits effective properties of resistance to corrosion. Thus, the invention also relates to the use of this polymer as corrosion-resistant protective coating for a substrate made of metal or for a substrate having a surface which is at least partially metallic, in particular in any application where the said metal substrate is liable to be used in a wet environment.

Finally, the invention also relates per se to any substrate, in particular of metal or of glass (or at the very least having a surface comprising metal or glass), which is coated, at least in part, with a polyurea according to the invention.

The invention relates in particular to any metal reinforcer coated with a polyurea according to the invention. It relates in particular to any metal thread, cord, film or plate, at least a portion of the surface of which is made of brass-coated steel, characterized in that the said brass-coated steel is itself coated with a polyurea in accordance with the invention.

Figure 2A:
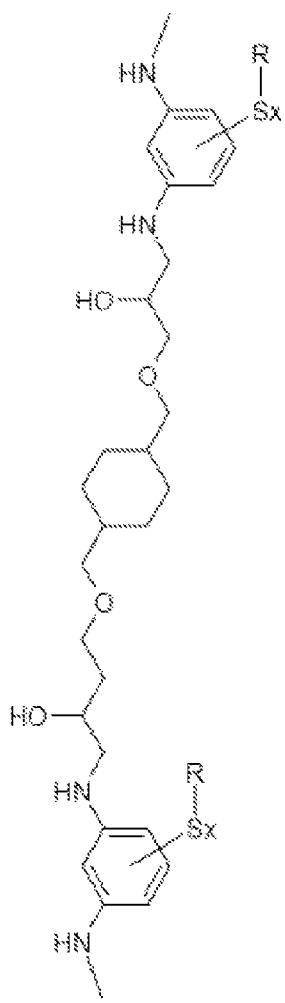
Figure 2B:
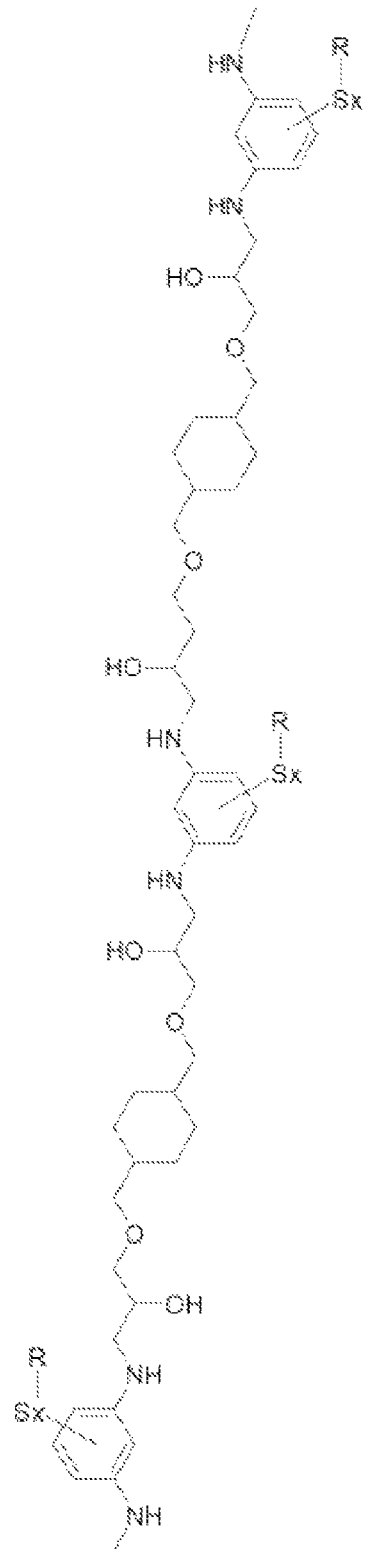
Figure 3A:
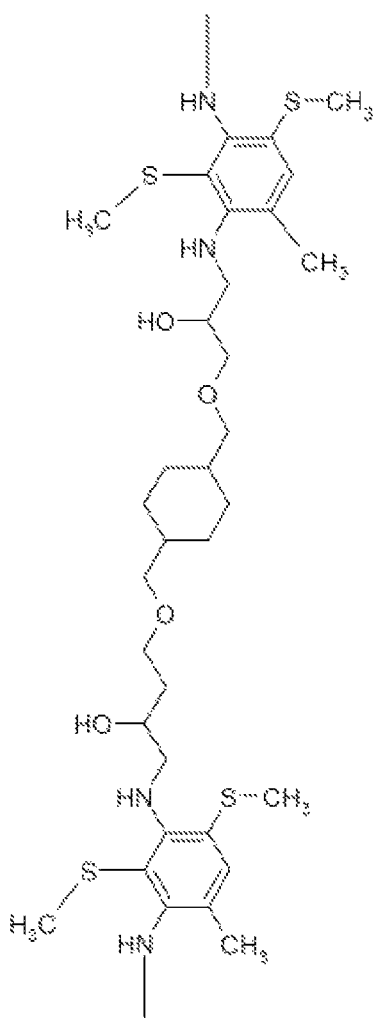
Figure 3B:
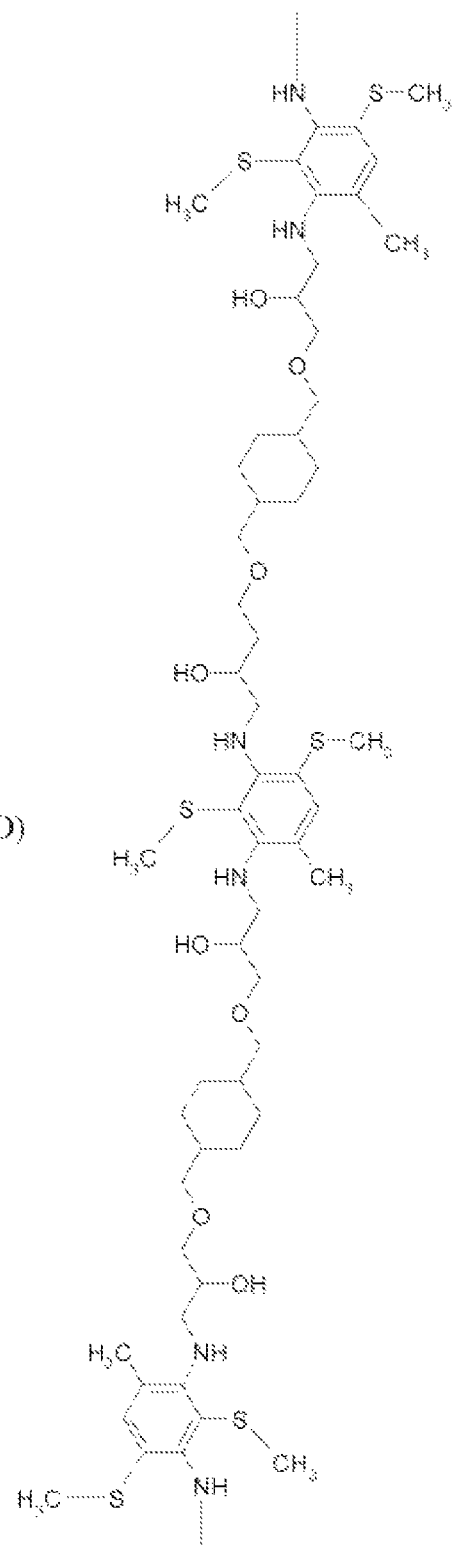
Figure 4:
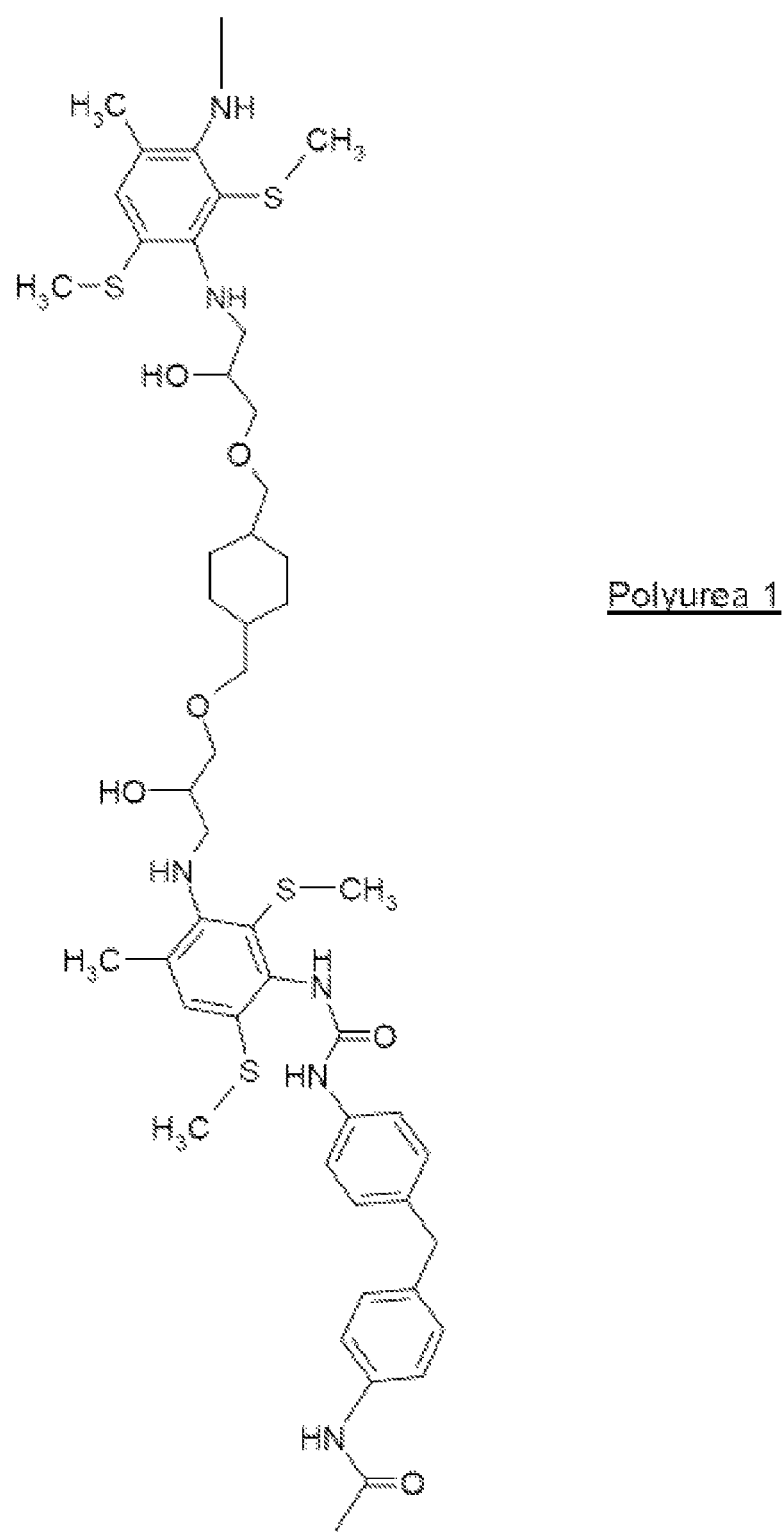
Figure 5:
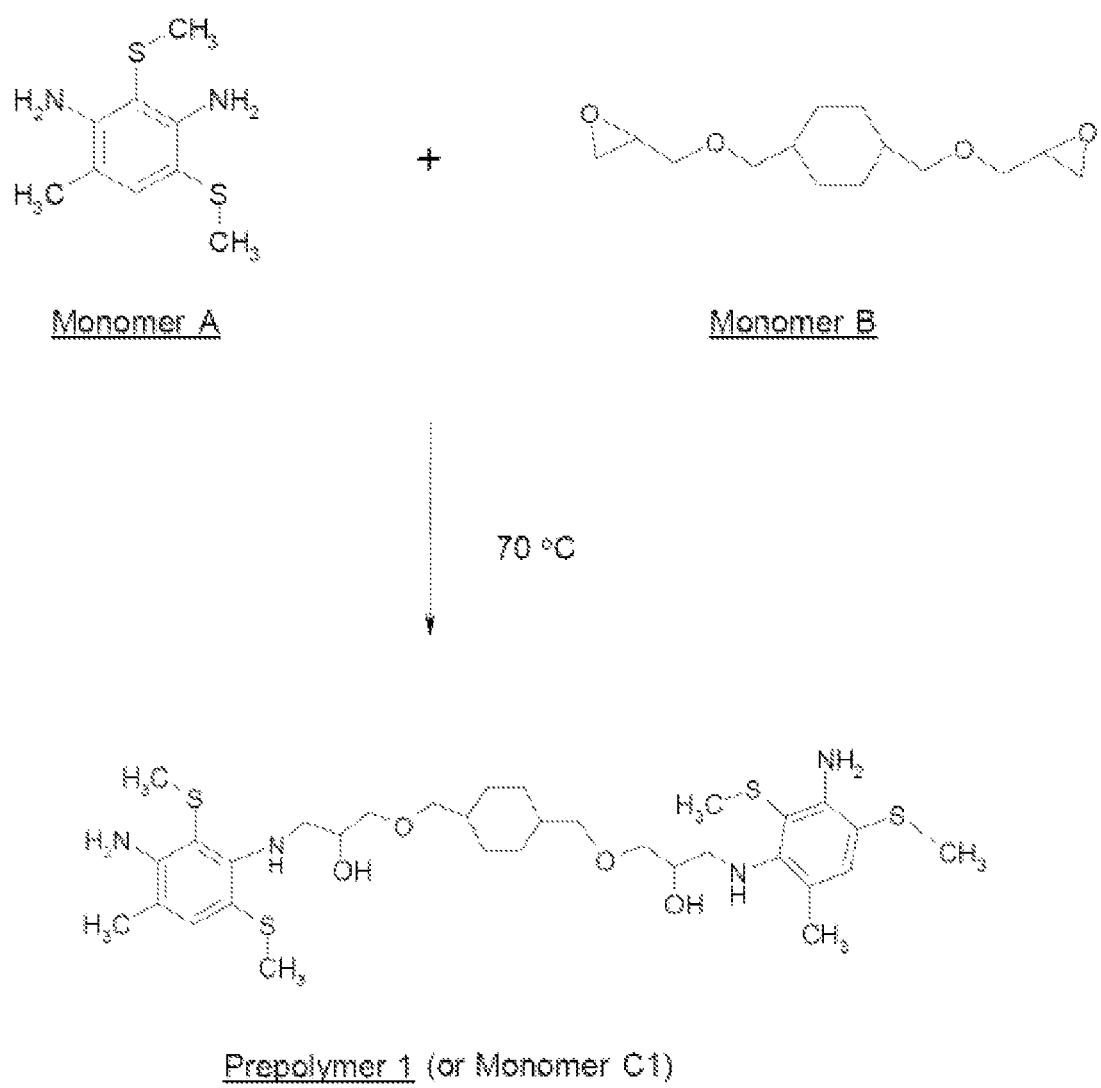
Figure 6:
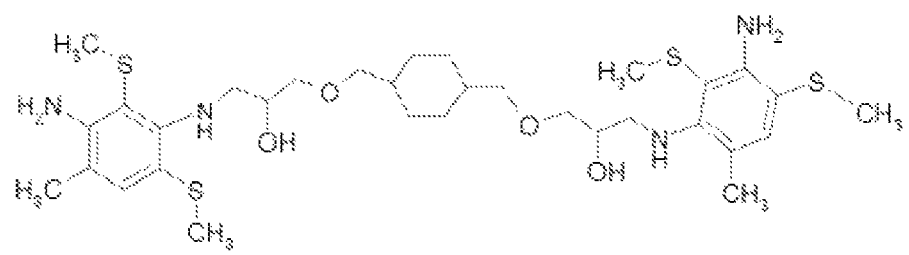
Figure 6:
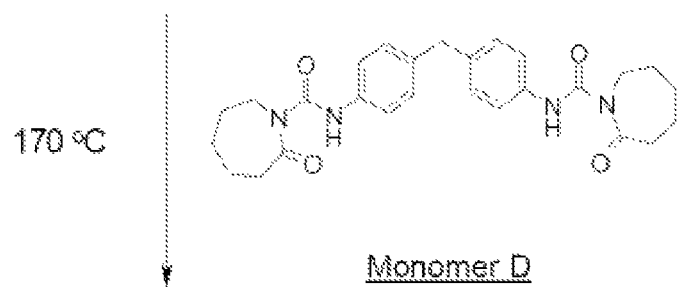
Figure 6:
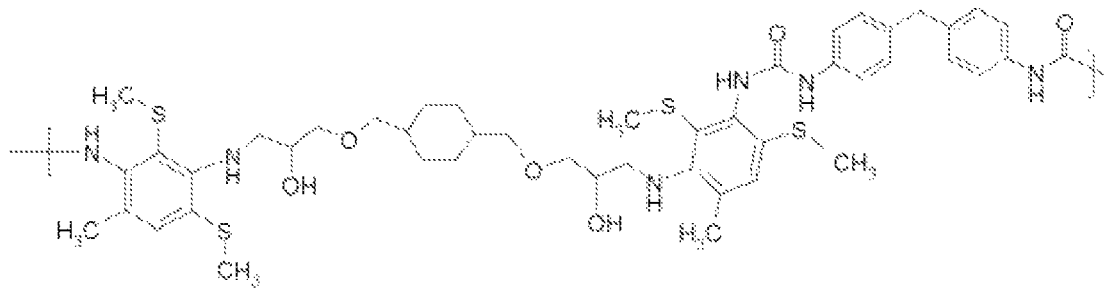
Figure 7:
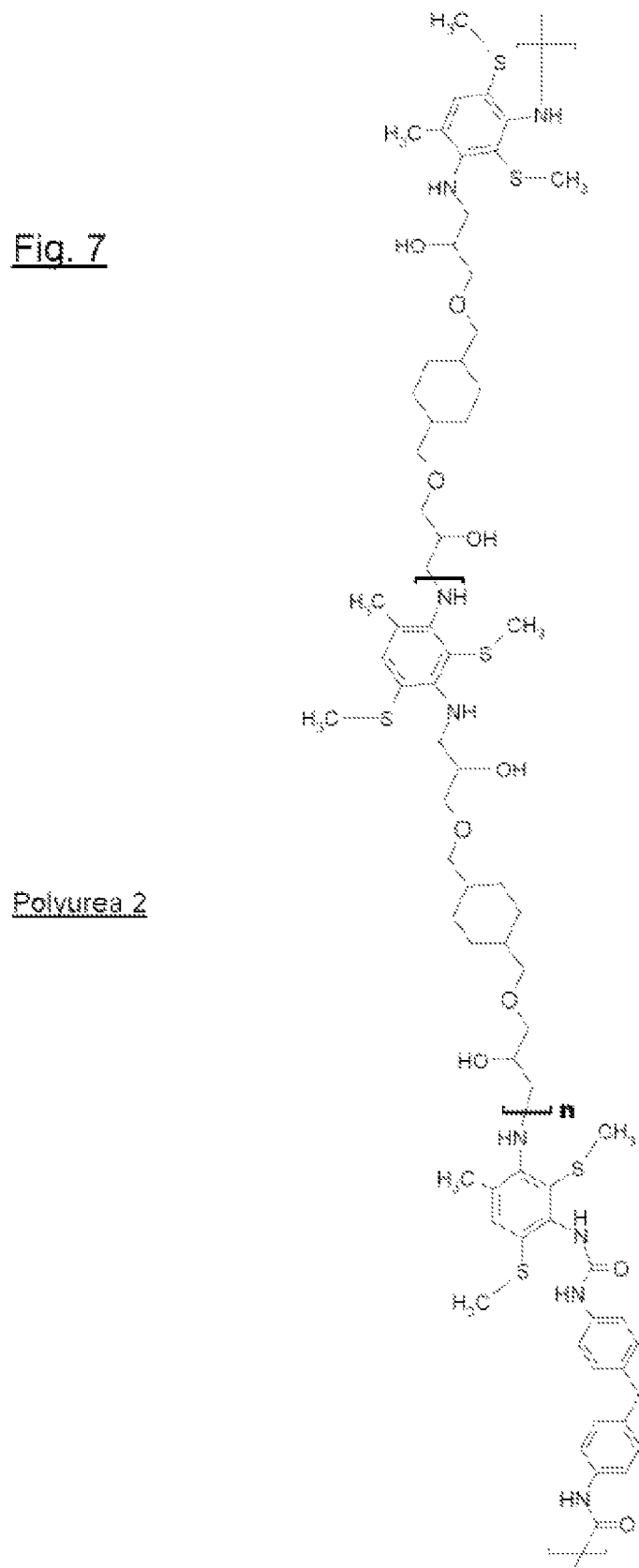
Figure 8:
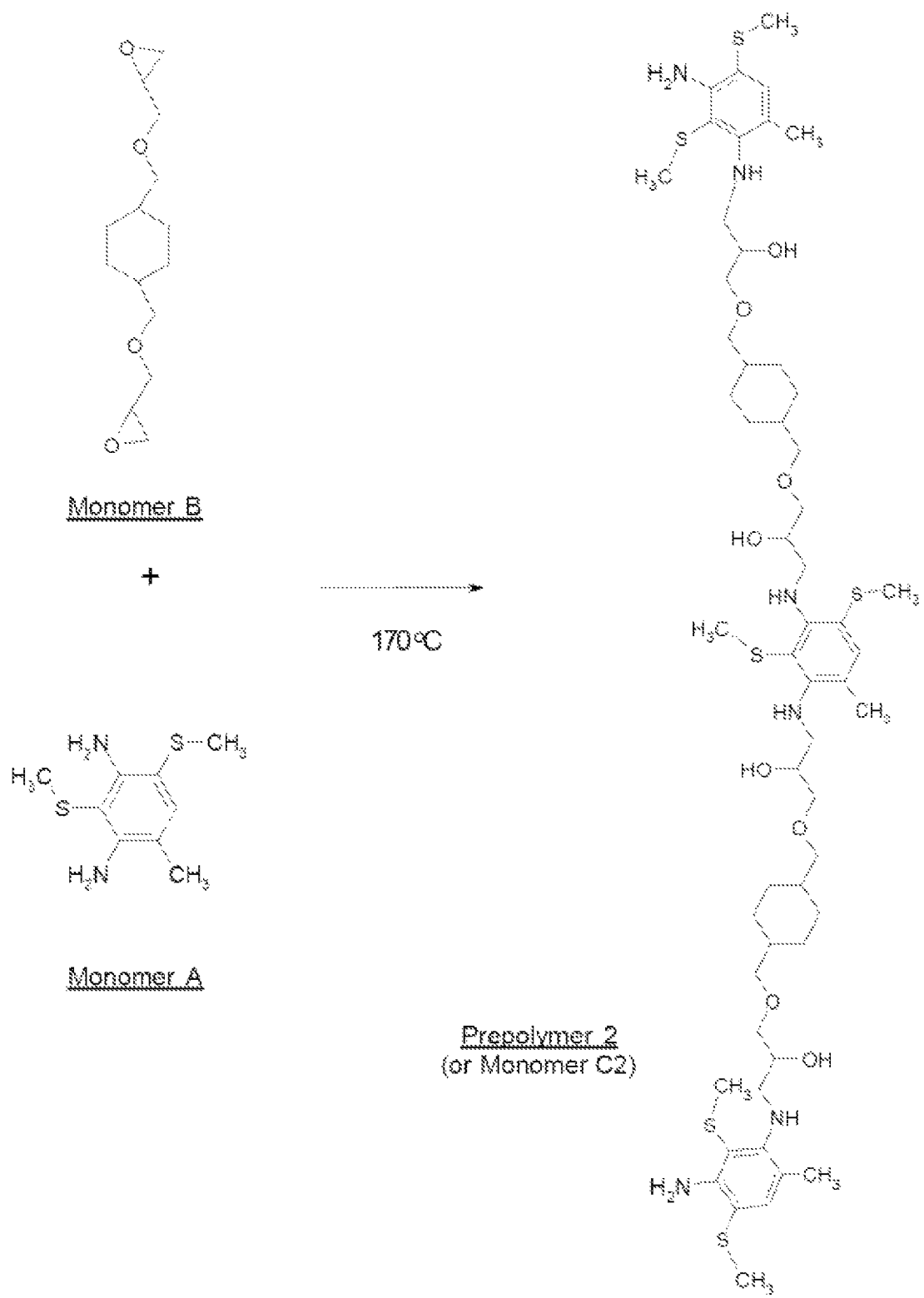
Figure 9:
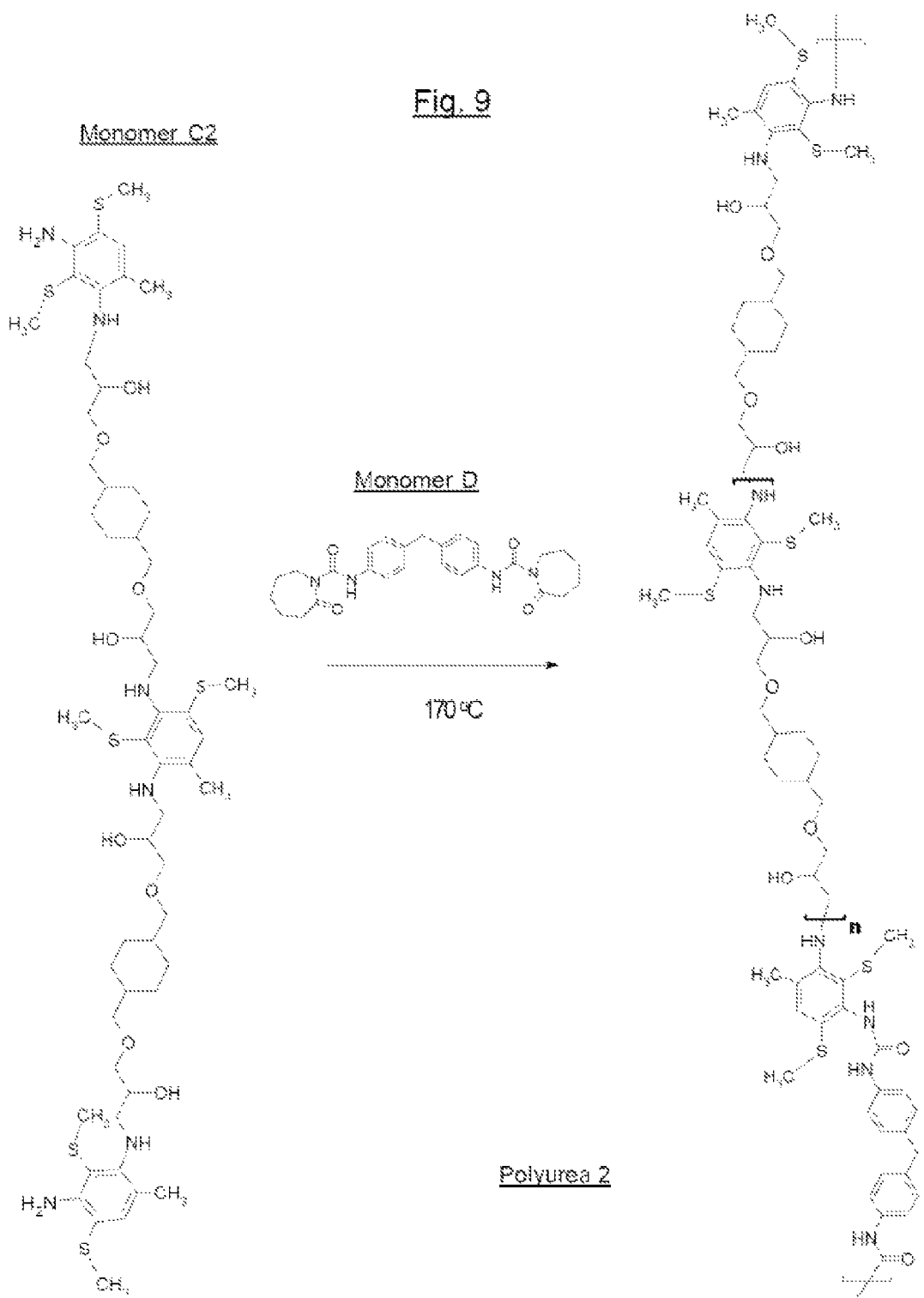

The invention and its advantages will be easily understood in the light of the detailed description and implementational examples which follow, and also of the figures relating to these examples, which represent or schematize:

a particularly preferred example of sulphur-comprising polyaromatic polyamine structural units, the sub-unit of general formula (I) of which corresponds to the specific formula (II) in which, on each phenylene group, two amino (NH) groups are in the meta position with respect to one another (FIG. 1);

two particularly preferred examples of sulphur-comprising polyaromatic polyamine structural units, the sub-unit of specific formula (II) of which corresponds to the more specific formula (II-A) or (II-B) in which "m" is equal to 1 for each $(CH_2)_m$ group, $Z_1$ and if appropriate $Z_2$ represent cyclohexane-1,4-dimethylene, and "n" is equal to 0 (II-A) or to 1 (II-B) respectively (FIGS. 2A and 2B);

two particularly preferred examples of sulphur-comprising polyaromatic polyamine structural units, the sub-units of specific formulae (II-A) and (II-B) of which correspond respectively to the more specific formulae (II-C) and (II-D) in which, in addition, each phenylene-diamino group corresponds to the specific formula (III-a) (FIGS. 3A and 3B);

an example of sequence (repeat structural unit) of a polymer in accordance with the invention (Polyurea 1), resulting from the reaction of a diisocyanate MDI (or MDI precursor) and of a polyamine (Prepolymer 1) (FIG. 4);

a scheme for the possible synthesis, starting from two Monomers A and B, of a polyamine (Prepolymer 1, also known as Monomer C1) used in the preparation of the polymer Polyurea 1 in accordance with the invention (FIG. 5);

a scheme for the possible synthesis of the polymer Polyurea 1 in accordance with the invention starting from the preceding polyamine (Monomere C1) and a blocked diisocyanate (MDI) (referred to as Monomer D) (FIG. 6);

an example of sequence (repeat structural unit) of a polymer in accordance with the invention (Polyurea 2), resulting from the reaction of a diisocyanate MDI (or MDI precursor) and of a polyamine (Prepolymer 2) (FIG. 7);

a scheme for the possible synthesis, starting from the two Monomers A and B, of another polyamine (Prepolymer 2, also known as Monomer C2) used in the preparation of the polymer Polyurea 2 in accordance with the invention (FIG. 8);

a scheme for the possible synthesis of the polymer Polyurea 2 in accordance with the invention starting from the preceding polyamine (Monomer C2) and a blocked diisocyanate (MDI) (Monomer D) (FIG. 9).

4. DETAILED DESCRIPTION OF THE INVENTION

It should be remembered first of all that a polyurea is a polymer comprising a plurality of urea (—NH—CO—NH—) bonds resulting, in a known way, from the addition reaction of a polyamine having at least two primary amine functional groups with a polyisocyanate (compound bearing at least two isocyanate —NCO functional groups), in particular with a diisocyanate in the case of a polyurea of the linear type.

The polyurea polymer of the invention, thus by definition comprising urea (—NH—CO—NH—) base units, has the essential characteristic of moreover comprising additional units comprising, on the one hand, at least one (that is to say, one or more) secondary alcohol functional group and, on the other hand, at least one (that is to say, one or more) ether, thioether or secondary amine functional group in the α (alpha) position with respect to the secondary alcohol functional group (that is to say, as a reminder and by known convention, borne by a carbon adjacent to the carbon bearing the secondary alcohol functional group).

In other words, an essential characteristic of the polyurea of the invention is thus that its additional units comprise at least one α-hydroxy-ether, α-hydroxy-thioether or α-hydroxy-amine (secondary amine) sub-unit.

Polyurea should be understood here as meaning any homopolymer or copolymer, in particular block copolymer, comprising the additional units above and urea base units.

These base units and additional units will be described in detail below.

According to a preferred embodiment, the additional units comprise at least one sub-unit denoted "M" of formula (A) chosen from the formulae:

  (A-1)

  (A-2)

  (A-3)

in which $F_n$ represents O (case of an ether functional group), S (case of a thioether functional group) or NH (case of a secondary amine functional group) and $R_1$ and $R_2$ represent an aliphatic, cycloaliphatic or aromatic hydrocarbon group which can comprise a heteroatom, such as S, O or N, and which preferably comprises from 1 to 12 carbon atoms.

More preferably, $R_1$ is an aliphatic group and more preferably still an alkyl group. More particularly, $R_1$ is an alkyl having from 1 to 5 carbon atoms, it being possible for this alkyl to be substituted or unsubstituted; more particularly still, $R_1$ represents a methyl or an ethyl, in particular a methyl.

More preferably, $R_2$ is an aliphatic group and more preferably still an alkylidene group. More particularly, $R_2$ is an alkylidene having from 1 to 5 carbon atoms, it being possible for this alkylidene to be substituted or unsubstituted; more particularly still, $R_2$ represents a methylidene.

Preferably, $F_n$ represents NH, that is to say that the additional units comprise, in this case, at least one secondary alcohol functional group and one secondary amine functional group in the alpha position with respect to one another. The corresponding formulae (A-1), (A-2) and (A-3) have been represented below in an expanded form:

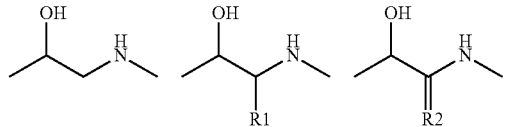

It is noted that, in the three "M" sub-units above, there indeed exists a secondary amine functional group in the α position with respect to a secondary alcohol functional group.

Of course, these representations are equivalent to the three representations in which the NH functional group is in the α' position (that is to say, on the other side) with respect to the secondary alcohol functional group.

According to another possible alternative embodiment of the invention, illustrated by way of examples by the three formulae below denoted (A-1'), (A-2') and (A-3'), there are 2 secondary alcohol functional groups (and not just one) which are located on either side of $F_n$ (ether, thioether or secondary amine functional group):

  (A-1')

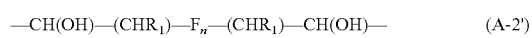  (A-2')

  (A-3')

The above sub-units denoted "M'" can be respectively described as α,α'-dihydroxy-ether, α,α'-dihydroxy-thioether or α,α'-dihydroxy-amine (secondary amine) sub-units, depending on the nature of $F_n$ (respectively O, S or NH).

More preferably, $F_n$ represents NH and the additional units comprise at least one sub-unit of formula (A-1); in other words, in such a case, the general sub-unit "M" is the specific sub-unit denoted "M1" of formula:

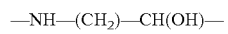

According to an even more preferred embodiment, the additional units comprise, in addition to the "M1" sub-unit above, at least one (that is to say, one or more) sulphur atom; in the case where several sulphur atoms are present, the latter can be isolated or in the form of polysulphides.

According to a particularly preferred embodiment, each sulphur atom is present in the form of a group of formula —$S_x$—R in which "x" is preferably an integer from 1 to 8 and R represents hydrogen or a hydrocarbon group which can comprise a heteroatom and which preferably comprises from 1 to 10 carbon atoms.

This sulphur atom or this sulphur-comprising group (—$S_x$—R) can be incorporated in an aliphatic group comprising, for example, from 1 to 30 and more particularly from 1 to 20 carbon atoms or in a cycloaliphatic group comprising, for example, from 3 to 30 and more particularly from 3 to 20 carbon atoms.

More preferably, this sulphur atom, in particular in the form of the group of formula —$S_x$—R above, is present on an aromatic group, the latter preferably comprising from 6 to 30 and more preferably from 6 to 20 carbon atoms.

An example of polyurea according to the invention which is particularly preferred, in which the additional units comprise at least one (that is to say, one or more) "M1" sub-unit as described above and at least one (that is to say, one or more) sulphur atom present on at least one (that is to say, one or more) aromatic group, is a polyurea comprising at least repeat structural units of the sulphur-comprising polyaromatic polyamine type which each comprise at least one sub-unit corresponding to the formula (I):

—HN—Ar$_1$—NH—CH$_2$—CH(OH)—(CH$_2$)$_m$—O—
Z$_1$—O—(CH$_2$)$_m$—CH(OH)—CH$_2$—[X]$_n$—
HN—Ar$_2$—NH—     (I)

in which:
X corresponds to the formula:

—HN—Ar$_3$—NH—(CH$_2$)—CH(OH)—(CH$_2$)$_m$—
O—Z$_2$—O—(CH$_2$)$_m$—CH(OH)—(CH$_2$)—

"n" represents an integer equal to zero or different from zero;
the "m" symbols, which are identical or different, represent an integer within a range from 1 to 10;
the $Z_1$ and $Z_2$ symbols, which are identical or different, represent a divalent bonding group comprising from 1 to 30 carbon atoms;
Ar$_1$, Ar$_2$ and Ar$_3$, which are identical or different, represent a phenylene group, one at least of these phenylene groups bearing one, two, three or four groups of formula —$S_x$—R in which "x" is an integer from 1 to 8 and R represents hydrogen or a hydrocarbon group which can comprise a heteroatom and which comprises from 1 to 10 carbon atoms.

Polyurea according to the invention which is particularly preferred should thus be understood here as meaning any homopolymer or copolymer, in particular block copolymer, comprising the structural units having a sub-unit of formula (I) above and urea (—NH—CO—NH—) units.

In the formula (I) above, "x" is an integer from 1 to 8, preferably from 1 to 4, more preferably equal to 1 or 2 and more particularly equal to 1.

R represents hydrogen or a substituted or unsubstituted hydrocarbon group which comprises from 1 to 10 carbon atoms and which can comprise a heteroatom, such as S, O or N. Preferably, R is an aliphatic group and more preferably an alkyl group. More preferably still, R is an alkyl having from 1 to 5 carbon atoms, it being possible for this alkyl to be substituted or unsubstituted; more particularly, R represents a methyl or an ethyl and more particularly still a methyl.

In the specific cases where, in the —$S_x$—R group of the sub-unit (I) above, R represents hydrogen, a person skilled in the art will understand that, during the synthesis of the corresponding prepolymer, by reaction of a starting diamine (for example Monomer A below) with a diepoxy compound (for example Monomer B below), the thiol —SH group can be protected from any side reaction with this diepoxy, in a known way, by an appropriate blocking group known to a person skilled in the art, for example as represented in the formulae below:

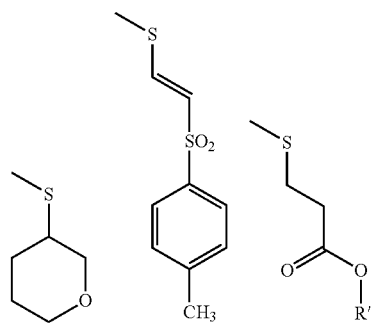

According to a preferred form of the invention, each of the Ar$_1$, Ar$_2$ and Ar$_3$ groups, which are identical or different, bears one, two, three or four groups of formula —$S_x$—R, in particular two —SR groups (x equal to 1), in which R is an alkyl having from 1 to 5 carbon atoms, R being more particularly a methyl or an ethyl and more particularly still a methyl.

According to a more preferred embodiment, Ar$_1$, Ar$_2$ and Ar$_3$, which are identical or different, each bear two —$S_x$—R groups, in particular two —SR groups (x equal to 1), in which R is an alkyl having from 1 to 5 carbon atoms, R being more particularly a methyl or an ethyl and more particularly still a methyl. More preferably still, in such a case, the two —SR, in particular —SCH$_3$, groups are in the meta position (or 1,3-position) with respect to one another on each phenylene group Ar.

The numbers "m" can be identical or different from one (CH$_2$)$_m$ group to another; preferably, each number "m" is equal to 1 or 2 and more preferably equal to 1.

The $Z_1$ and $Z_2$ symbols, which are identical or different, represent a divalent bonding group which is preferably a hydrocarbon group but which can also comprise a heteroatom, such as S, O or N; they can be substituted or unsubstituted and saturated or unsaturated; they comprise from 1 to 30 carbon atoms, preferably from 2 to 20 carbon atoms and more preferably from 2 to 10 carbon atoms.

More preferably, $Z_1$ and $Z_2$ represent an aliphatic group comprising from 2 to 20 carbon atoms or a cycloaliphatic group comprising from 3 to 20 carbon atoms, more preferably still an aliphatic or cycloaliphatic group comprising from 3 to 10 carbon atoms. Mention will in particular be made, among these more preferred groups, of cyclohexane-1,4-dimethylene, of formula:

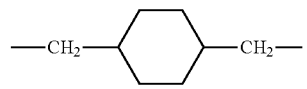

According to another preferred embodiment, "n" is equal to zero. In such a case, the sub-unit of formula (I) thus has the simplified formula which follows:

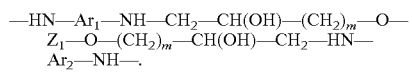

In particular, when "n" is equal to zero and "m" is equal to 1 for each $(CH_2)_m$ group, the sub-unit of formula (I) then has the simplified formula:

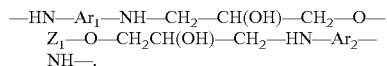

According to another preferred embodiment, "n" is equal to 1 or greater than 1; when "n" is greater than 1, it is in particular within a range from 2 to 20, more particularly from 2 to 10 and in particular from 2 to 5.

The divalent phenylenediamino ($-HN-Ar_1-NH-$, $-HN-Ar_2-NH-$ and $-HN-Ar_3-NH-$) groups can be identical or different.

On each phenylene group Ar, the two amino (NH) groups can be in the meta, ortho or para position with respect to one another.

According to a preferred embodiment, on each phenylene group Ar, the two amino (NH) groups are in the meta position (or 1,3-position) with respect to one another. In other words, in such a case, the sub-unit of general formula (I) thus has, as expanded formula (II), that which was represented in the appended FIG. 1.

Still in the case where the two amino (NH) groups are in the meta position with respect to one another on each phenylene group and that, according to a more preferred embodiment, "m" is equal to 1 for each $(CH_2)_m$ group and "n" is equal to 0, $Z_1$ being, for example, cyclohexane-1,4-dimethylene, then the formula (II) above has as more specific formula the expanded formula (II-A) as represented in the appended FIG. 2A.

Still in the case where the two amino (NH) groups are in the meta position with respect to one another on each phenylene group and that, according to another more preferred embodiment, "m" is equal to 1 for each $(CH_2)_m$ group and "n" is equal to 1, $Z_1$ and $Z_2$ being, for example, cyclohexane-1,4-dimethylene, then the formula (II) above has as more specific formula the expanded formula (II-B) as represented in the appended FIG. 2B.

According to another preferred embodiment of the invention, the divalent phenylenediamino ($-HN-Ar_1-NH-$, $-HN-Ar_2-NH-$ and $-HN-Ar_3-NH-$) groups, which are identical or different, are chosen from the compounds 3,5-dimethylthio-2,4-toluenediamine, 3,5-dimethylthio-2,6-toluenediamine and their mixtures, respectively corresponding to the formulae (III-a) and (III-b) below:

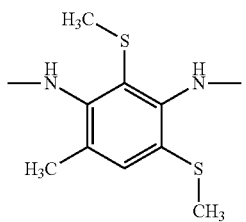

(III-a)

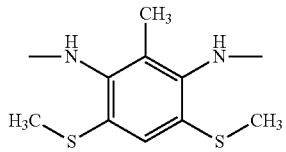

(III-b)

In other words, in such a case, if each phenylenediamino group has, for example, as specific formula, the formula (III-a) above, then the preceding formulae (II-A) and (II-B) then have, as respective specific formulae, the formulae (II-C) and (II-D), respectively illustrated in the appended FIGS. 3A and 3B.

According to a preferred embodiment, in the polyurea polymer of the invention, the sulphur-comprising polyaromatic polyamine structural units having a sub-unit of formula (I) which were described above and the base structural units having urea ($-NH-CO-NH-$) units are connected to one another according to a sub-unit corresponding to the formula (IV) below:

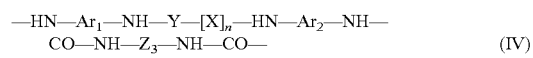

(IV)

which:

$Ar_1$, $Ar_2$, X, "n", "m" and $Z_1$ have the meanings given above;

Y represents the string:

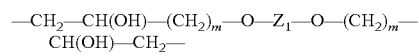

and $Z_3$ represents an aliphatic, cycloaliphatic or aromatic divalent bonding group, the aliphatic group preferably comprising from 1 to 30 (more preferably from 1 to 20) carbon atoms, the cycloaliphatic group preferably comprising from 3 to 30 (more preferably from 3 to 20) carbon atoms and the aromatic group comprising from 6 to 30 (more preferably from 6 to 20) carbon atoms.

The polyurea polymer of the invention is preferably a polymer of the linear type, thus resulting essentially from the addition of a polyamine having only two primary amine functional groups and of a diisocyanate. The diisocyanate used can be aromatic or aliphatic; it can be a monomer, a prepolymer or a quasi-prepolymer, indeed even a polymer.

According to a preferred embodiment, the diisocyanate from which the polymer of the invention results is selected from the group consisting of the following aromatic compounds: diphenylmethane diisocyanate (abbreviated to "MDI"), toluene diisocyanate ("TDI"), naphthalene diisocyanate ("NDI"), 3,3'-bitoluene diisocyanate ("TODI"), para-phenylene diisocyanate ("PPDI"), their various isomers and the mixtures of these compounds and/or isomers.

More preferably, use is made of an MDI or a TDI, more preferably still of an MDI.

All the isomers of MDI (in particular 2,2'-MDI, 2,4'-MDI and 4,4'-MDI) and their mixtures can be used, as well as "polymeric" MDIs (or "PMDIs") comprising oligomers of following formula (with p equal to or greater than 1):

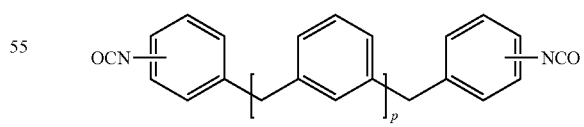

Diisocyanate compounds of the aliphatic type can also be used, such as, for example, 1,4-tetramethylene diisocyanate, 1,6-hexane diisocyanate ("HDI"), 1,4-bis(isocyanatomethyl)cyclohexane, 1,3-bis(isocyanatomethyl)cyclohexane, 1,3-bis(isocyanatomethyl)benzene, 1,4-bis(isocyanatomethyl)benzene, isophorone diisocyanate ("IPDI"), bis(4-isocyanatocyclohexyl)methane diisocyanate ("H12MDI") or 4,4'-dicyclohexylmethane diisocyanate ("H13MDI").

According to a particularly preferred embodiment, the diisocyanate used is 4,4'-MDI (4,4'-diphenylmethane diisocyanate), having the formula:

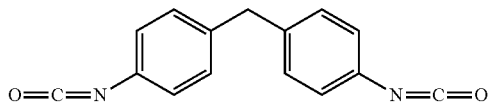 [SMILES: O=C=Nc1ccc(Cc2ccc(N=C=O)cc2)cc1]

or, if several diisocyanates are used, constitutes the predominant diisocyanate by weight, preferably representing, in the latter case, more than 50% of the total weight of the diisocyanate compounds.

Use may also advantageously be made of a caprolactam-blocked 4,4'-MDI (for example the product in the solid form "Grilbond IL-6" from EMS), of formula:

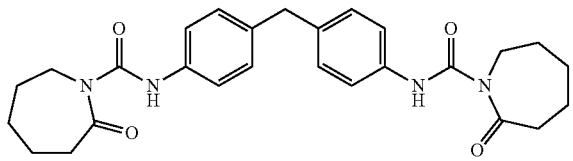 [SMILES: O=C1CCCCCN1C(=O)Nc1ccc(Cc2ccc(NC(=O)N3CCCCCC3=O)cc2)cc1]

As the invention is not limited to a polyurea of the linear type (as a reminder, case of a diisocyanate), it will also be possible to use, in particular with the aim of increasing the Tg of the polymer of the invention by formation of a three-dimensional network, a triisocyanate compound, such as, for example, an MDI trimer having a triazine nucleus of the formula below:

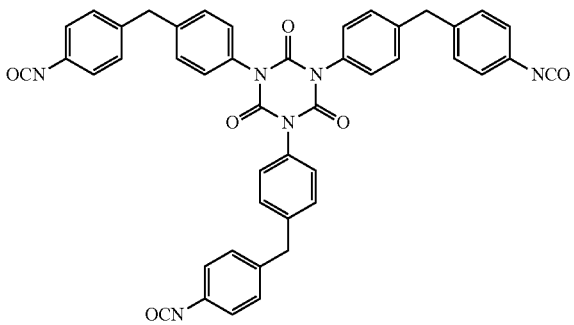

The appended FIGS. 4 to 9 represent preferred examples of polyureas in accordance with the invention and also various possible schemes for the synthesis of these polymers.

First of all, the appended FIG. 4 represents a string example of a polymer (hereinafter "Polyurea 1") in accordance with the invention, resulting from the reaction of a monomer MDI and a starting diamine (hereinafter "Prepolymer 1") of general formula:

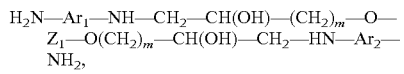

in which $Ar_1$, $Ar_2$ and $Z_1$ have the general definitions given above for the sub-units of formula (I) and more particularly the characteristics corresponding to the final sub-unit of formula (II-A), namely that the two amino ($H_2N$— and —NH) groups are in the meta position with respect to one another on each phenylene ($Ar_1$ and $Ar_2$) group, "m" is equal to 1 for each $(CH_2)_m$ group, "n" is equal to 0 and $Z_1$ is cyclohexane-1,4-dimethylene.

FIGS. 5 and 6 which follow illustrate examples of processes which can be used for the synthesis of Prepolymer 1 and Polyurea 1 respectively, which processes will be described in detail subsequently.

The appended FIG. 7 represents another string example of a polymer ("Polyurea 2") in accordance with the invention, resulting from the reaction of a monomer MDI and another starting diamine (hereinafter "Prepolymer 2") of general formula:

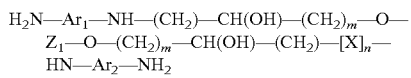

with X corresponding to the formula:

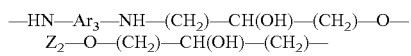

in which $Ar_1$, $Ar_2$, $Ar_3$, $Z_1$ and $Z_2$ have the general definitions given above for the sub-units of formula (I) and more particularly the characteristics corresponding to the final sub-unit of formula (II-B), namely that the two amino groups are in the meta position with respect to one another on each phenylene ($Ar_1$, $Ar_2$ and $Ar_3$) group, "m" is equal to 1 for each $(CH_2)_m$ group, "n" is equal to 1 and $Z_1$ and $Z_2$ represent cyclohexane-1,4-dimethylene.

FIGS. 8 and 9 which follow illustrate examples of processes which can be used for the synthesis of Prepolymer 2 and Polyurea 2 respectively, which processes will be described in detail subsequently.

Typically, the polymer of the invention can comprise from ten to several hundred, preferably from 20 to 200, structural units having a sub-unit of formula (I), in particular structural units as represented as examples in FIGS. 7 and 9. Its glass transition temperature Tg, measured by DSC (Differential Scanning calorimetry), for example according to ASTM D3418, is preferably greater than 50° C., more preferably greater than 100° C. and in particular of between 130° C. and 250° C.

As indicated above, this polymer of the invention can advantageously be used as hydrophobic coating on any type of substrate, in particular made of metal or glass, or also as adhesion primer on any type of metal reinforcer, such as, for example, a thread, a film, a plate or a cord made of carbon steel coated or not coated with brass, intended in particular to reinforce an unsaturated rubber matrix, such as natural rubber.

5. EXAMPLES OF THE IMPLEMENTATION OF THE INVENTION

In the present patent application, unless expressly indicated otherwise, all the percentages (%) shown are percentages by weight.

The tests which follow describe first of all the synthesis of Prepolymers 1 and 2, also respectively denoted Monomers C1 and C2, from Monomer A and Monomer B, and then the syntheses of Polyureas 1 and 2 from the respective Prepolymers 1 and 2 (Monomers C1 and C2) and from a Monomer D (caprolactam-blocked MDI). The syntheses of two other polymers in accordance with the invention (Polyureas 3 and 4) are then described.

During these tests, various adhesion tests are carried out, on different substrates (glass or metal), in order to illustrate the excellent adhesive performance of the polymer of the invention.

5.1. Test 1-Preparation of Prepolymers 1 and 2

Prepolymers 1 and 2 (also called Monomers C1 and C2), the respective formulae of which are given in FIGS. 5 and 8, were prepared from two Monomers A and B according to the procedures represented diagrammatically in FIGS. 5 and 8, as explained in detail below.

Monomer A is the product Ethacure 300 (supplier Albemarle, Belgium), available in the form of a relatively viscous liquid of brownish colour; it is composed to approximately 96% of a mixture of 3,5-bis(methylthio)-2,4-toluenediamine and 3,5-bis(methylthio)-2,6-toluenediamine isomers (ratio by weight of approximately 4/1 according to chromatographic analysis).

Monomer B is 1,4-cyclohexanedimethanol diglycidyl ether (abbreviated to "CHXDE") (supplier Aldrich, Switzerland), available in the form of a technical grade (approximately 61% of a mixture of cistrans diepoxides). According to the technical data available (see, for example, document US 2011/0039982), CHXDE is a complex chemical mixture comprising the diepoxides (approximately 61%), residual cyclohexanedimethanol (approximately 2%), monoepoxides (approximately 8%) and, finally, polymeric epoxide entities (approximately 29%). According to the NMR analysis, the epoxide equivalent weight (EEW) of the compound used here is equal to approximately 159 (theoretical EEW equal to 128 in the case of a pure compound).

During a first stage, the two Monomers A and B above were first of all purified as follows. The product Ethacure 300 (approximately 40 g) is deposited in a chromatography column (700 g of silica); a mixture of hexane/dichloromethane/ethyl acetate solvent (ratios 10:8:2) is used as mobile phase. The 2,4-toluenediamine isomer is eluted first, followed by the second 2,6-toluenediamine isomer. Under these conditions, the impurities (blue-green colour) are not eluted and can be easily separated from the targeted constituents.

The identification of the 2,4 and 2,6 isomers is confirmed by the $^1$H NMR (500 MHz) analysis in the solvent $d_6$-DMSO, which gives the following results:

3,5-bis(methylthio)-2,4-toluenediamine
6.96 (s, 1H), 5.21-5.23 (d, 4H), 2.16 (s, 3H), 2.10 (s, 3H), 1.97 (s, 3H).

3,5-bis(methylthio)-2,6-toluenediamine
7.22 (s, 1H), 5.09 (s, 4H), 2.15 (s, 6H), 1.92 (s, 3H).

For its part, the product "CHXDE" is isolated by vacuum distillation according to the experimental conditions described in Example 3 of the abovementioned document US 20110039982. The cistrans structures of the diepoxide are confirmed by $^1$H NMR analysis in $d_6$-DMSO.

After these purification stages, Prepolymers 1 and 2 were prepared as represented diagrammatically in FIGS. 5 and 8 respectively, according to the more detailed information which follows.

180 mg of Monomer B (0.702 mmol) and then 3 ml of tetrahydrofuran (THF) are placed in a predried (100° C. under vacuum) 25 ml three-necked round-bottomed flask equipped with a magnetic bar and a reflux condenser provided with circulation for nitrogen. 150 mg of Monomer A (i.e., 0.702 mmol) are then added with stirring. The mixture obtained is heated at reflux at 70° C. for one hour and then the THF is removed by distillation. The transparent liquid thus obtained (Prepolymer 1 or Monomer C1) was analysed by DSC from −80° C. to 200° C.: the Tg measured (second pass) is equal to approximately −40° C.

Prepolymer 2 (Monomer C2) was prepared in a similar way starting from the same two compounds (150 mg of Monomer A and 180 mg of Monomer B), the mixture being heated at 170° C. for one and a half hours (without THF solvent) in a 25 ml round-bottomed flask equipped with a reflux condenser, the reaction being carried out under air. The reaction product thus obtained (Prepolymer 2 or Monomer C2) exhibited a Tg of approximately +31° C. (second pass of DSC).

5.2. Test 2-Synthesis of Polyureas 1 and 2

In a final stage as represented diagrammatically in FIGS. 6 and 9 respectively, Polyureas 1 and 2 were then synthesized by reaction of Prepolymers 1 and 2 with Monomer D (caprolactam-blocked MDI), as described below.

330.5 mg of Monomer C1 (Prepolymer 1) and then 336 mg of Monomer D (Grilbond IL6) are placed in 8 ml of DTP (1,3-dimethyl-3,4,5,6-tetrahydro-2(1H)-pyrimidinone; CAS 7226-23-5) solvent in a glass vessel. The suspension is placed under mechanical vibration (vortex device) for a few seconds until Monomer D has completely dissolved. 1.5 ml of this solution are then uniformly deposited over a glass sheet (10×10 cm); the glass sheet is subsequently placed in an oven (ventilation under air) at 170° C. for 15 min, which stage is followed by 15 min at 190° C. under vacuum in order to remove the traces of solvent.

The thin layer of Polyurea 1 thus obtained displayed excellent adhesion to the glass (impossibility of separating by pulling the polymer from the glass). This Polyurea 1, analysed by DSC, exhibited a Tg of approximately 190° C. (second pass).

For the synthesis of Polyurea 2, Prepolymer 2 (Monomer C2, 0.702 mmol) was partially dissolved in 12 ml of DTP heated in a first step at approximately 110° C. for 2 min, and then, by heating the medium at 170° C. for 30 min, a highly soluble product is obtained. 336 mg of Monomer D (0.702 mmol) were subsequently added and everything was mixed in a stirrer (vortex device) until Monomer D had completely dissolved.

4 ml of the solution thus obtained were then uniformly deposited over a sheet made of zinc-coated steel (100 cm$^2$ surface area); everything was placed in an oven (ventilation under air) at 170° C. for 15 min. The transparent yellow film was subsequently treated under vacuum at 190° C. for 15 min in order to remove the traces of solvent.

The final Polyurea 2 thus obtained, in the form of a thin film, displayed excellent adhesion to the steel sheet (impossibility of separating by pulling the polymer from the metal). This Polyurea 2, analysed by DSC between −80° C. and +200° C. (according to a gradient of 10° C./min), exhibited a Tg of approximately 160° C. (second pass).

5.3. Test 3-Tests of Adhesion in a Metal/Rubber Composite

In another test, a Polyurea 1 as described above and illustrated in FIG. 4 was prepared, this time by simultaneous reaction of Monomers A (150.5 mg), B (180 mg) and D (336 mg), by dissolving the 3 compounds in 8 ml of DPT, without using THF solvent and without passing through the stage of Prepolymer 1.

Once the compounds are dissolved in the DPT, 0.1 ml of the solution was uniformly deposited over a strip made of brass-coated steel (steel with a carbon content equal to approximately 1%) of dimensions 10 cm×0.5 cm×0.2 mm and then everything was placed in an oven at 175° C. (ventilation under air) for 15 min and then at 175° C. under vacuum for an additional 15 min.

The strip was subsequently cooled to ambient temperature and then 0.75 ml of a solution of epoxidized natural rubber (ENR, with a degree of epoxidation of 25%, supplier Aldrich) and diisocyanate (Suprasec 2020 liquid MDI from Huntsman) was deposited on the thin layer of polyurea film thus formed, which solution was prepared as follows: 150 mg of ENR were dissolved beforehand in 5 ml of toluene at 23° C. for 30 min with stirring (magnetic bar); 100 mg of diisocyanate were subsequently added under a stream of nitrogen. The strip thus prepared was finally treated in an oven at 100° C. under vacuum for 15 min.

The strip made of brass-coated steel thus coated with the film of Polyurea 1, itself covered with the thin layer of ENR, was subsequently placed in a conventional rubber composition for a belt reinforcement of a passenger vehicle tyre, based on natural rubber, on carbon black and silica as filler and on a vulcanization system (sulphur and sulphenamide accelerator), this composition being devoid of cobalt salt.

The metal/rubber composite test specimen thus prepared was then placed under a press and everything was cured (vulcanized) at 165° C. for 30 min under a pressure of 20 bar.

After vulcanization of the rubber, excellent adhesive bonding between the rubber matrix and the strip of metal was obtained, despite the absence of cobalt salt in the rubber matrix; this is because, during peel tests carried out both at ambient temperature (23° C.) and at high temperature (100° C.), it was found that the failure occurred systematically in the rubber matrix itself and not at the interphase between metal and rubber.

Other adhesive bonding tests, this time carried out on a sheet made of steel coated with zinc by galvanization, with a thickness of the layer of polyurea according to the invention varying from 3 to 10 μm, themselves also displayed excellent adhesion to the rubber (systematic failure in the rubber matrix).

5.4. Test 4-Synthesis of Polyurea 3

During an additional test, a new polymer in accordance with the invention (Polyurea 3) was synthesized by reaction in solution (DTP solvent) of Monomer C (Prepolymer 1, addition product of Monomers A and B, both used in this test in purified form) with solid MDI (in this instance in the non-blocked form, Sigma-Aldrich), according to the procedure which follows. 1.5 g of purified Monomer B ($4^{th}$ fraction) and then 20 ml of DTP solvent are added to a dry apparatus equipped with a 250 ml three-necked round-bottomed flask, with a reflux condenser, with a magnetic bar and with circulation of nitrogen. At the same time, a first solution of 1.5 g of 3,5-bis(methylthio)-2,4-toluenediamine (isolated from the product Ethacure 300) in 30 ml of DTP was prepared and placed in a dropping funnel and a second solution of 1.75 g of diphenylmethane diisocyanate (MDI) dissolved in 30 ml of DTP was prepared and placed in a second dropping funnel, everything under nitrogen.

The aromatic amine and MDI solutions were added dropwise with stirring and at 100° C. (internal temperature of the round-bottomed flask). The polymerization reaction was continued at 100° C. for 4 h, followed by a stage at 160° C. for 1 h. The transparent yellow solution (1.5 ml) thus obtained was uniformly deposited over a glass sheet (10 cm×10 cm) and then placed in an oven at 170° C. (ventilation under air) for 15 min, which stage is followed by treatment at 190° C. under vacuum for 15 min in order to remove any trace of solvent.

The final Polyurea 3 thus obtained, in the form of a thin film, displayed excellent adhesion, on the one hand to glass (impossibility of separating by pulling the polymer from the glass) and, on the other hand, in a test specimen of metal (sheet of brass-coated steel)/rubber composite (systematic failure in the rubber matrix), as described above. This Polyurea 3, analysed by DSC between −80° C. and +200° C. (according to a gradient of 10° C./min), exhibited a Tg of approximately 150° C. (second pass).

Furthermore, polymer (Polyurea 3) was precipitated by pouring, with stirring, 20 ml of the preceding yellow polymer solution into a hexane/2-propanol (ratio 1/1) solvent mixture (800 ml) and by then cooling everything between 0 and +5° C. for 1 h. The white precipitate in the powder form was subsequently isolated by filtration and then dried in an oven at 60° C. under vacuum for 2 h. 5 ml of acetone was added to the white solid and the soluble residues were thus extracted from the polymer at 40° C. for 15 min. This operation was repeated twice. Polyurea 3 thus purified no longer showed 3,5-bis(methylthio)-2,4-toluenediamine residue.

Then, with the aim of increasing its Tg, Polyurea 3 thus purified (330 mg) and diisocyanate (336 mg of Grilbond IL6 powder) were mixed and completely dissolved in 8 ml of DTP. The transparent yellow solution (1.5 ml) thus obtained was uniformly deposited over a glass sheet (10×10 cm) and then placed in an oven at 170° C. (ventilation under air) for 15 min, which stage is followed by 15 min at 190° C. under vacuum in order to remove the traces of solvent. The thin film thus obtained exhibited excellent adhesion to the glass (impossibility of separating by pulling the polymer from the glass). The DSC analysis revealed a Tg equal to approximately 188° C. (at the $3^{rd}$ pass).

5.5. Test 5-Synthesis of Polyurea 4

Finally, during a new and final test, with the aim of increasing both the Tg of the polymer of the invention and its thermal and chemical stability, a novel polyurea (Polyurea 4) was synthesized, this time by direct reaction between Monomer A (1 equivalent), Monomer B (1 equivalent) and Monomer D (3 equivalents of MDI) in the presence of N,N'-dimethylbenzylamine (DBA) as MDI trimerization catalyst, this being done according to the detailed procedure which follows.

2.56 g of purified Monomer B ($4^{th}$ fraction), 16 μl of DBA (i.e., approximately 0.25%) and 3.75 g of liquid MDI (Suprasec 2020 from Huntsman) were added to a dry apparatus equipped with a 250 ml round-bottomed flask, a magnetic bar and a stream of nitrogen. 40 ml of toluene were added and the solution was stirred at ambient temperature for 5 min (no apparent reaction observed). 10% by volume of the solution thus obtained was rapidly mixed with 214.3 mg of purified 3,5-bis(methylthio)-2,4-toluenediamine; this liquid mixture was deposited (1.5 ml) on a glass sheet preheated in an oven at 170° C. and then left under vacuum at 170° C. for 15 min. A transparent film rapidly formed on the glass sheet. The heat treatment was continued at 250° C. for 5 min (ventilation under air); there was no yellow colouring of the film.

The polyurea thus modified (Polyurea 4), comprising additional polyoxazolidine sub-units, was subsequently analysed by DSC between 80° C. and 330° C.; it exhibited a Tg of approximately 233° C. at the $2^{nd}$ pass and of approximately 244° C. at the $3^{rd}$ pass DSC. It proved to be stable up to 280° C., a partial decomposition being observable above 300° C. (endothermicity).

In conclusion, the above tests demonstrate that the polyurea polymer of the invention, characterized in particular by a high glass transition temperature and a high thermal and chemical stability, exhibits excellent adhesion to glass or metal.

Used in particular as adhesion primer on metal in metal/rubber composites, this polymer makes it possible very advantageously to adhesively bond the metal to the rubber matrices using simple textile adhesives, such as "RFL" (resorcinol/formaldehyde latex) adhesives or other equivalent adhesive compositions, or also directly (that is to say, without employing such adhesives) to these rubber matrices when the latter comprise, for example, appropriate functionalized unsaturated elastomers, such as epoxidized elastomers.

Thus, the cobalt salts (or other metal salts) can in particular be dispensed with in the rubber compositions intended to be connected to brass-coated metal reinforcers.

The invention claimed is:

1. A polyurea comprising at least urea base units of formula —NH—CO—NH— and additional units,
    wherein the additional units are units of the sulfur-comprising polyaromatic polyamine type comprising at least one sub-unit corresponding to the formula:

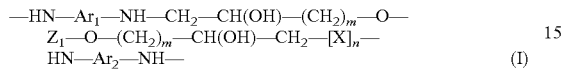

(I)

wherein X represents the string:

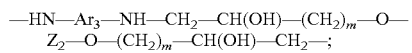

wherein n represents an integer equal to zero or different from zero;
    wherein m, which are identical or different, represent an integer within a range from 1 to 10;
    wherein $Z_1$ and $Z_2$ represent cyclohexane-1,4-dimethylene; and
    wherein $Ar_1$ $Ar_2$ and $Ar_3$, which are identical or different, each represent a phenylene group, at least one of these phenylene groups bearing one, two, three or four groups of formula —$S_X$—R in which x is an integer from 1 to 8 and R represents hydrogen or a hydrocarbon group which optionally comprises a heteroatom and which comprises from 1 to 10 carbon atoms.

2. The polyurea according to claim 1, wherein n is equal to 1.

3. The polyurea according to claim 1, wherein n is within a range from 2 to 20.

4. The polyurea according to claim 3, wherein n is within a range from 2 to 10.

5. The polyurea according to claim 1, wherein m, which are identical or different, represent an integer within a range from 1 to 5.

6. The polyurea according to claim 5, wherein m, which are identical or different, represent an integer equal to 1 or 2.

7. The polyurea according to claim 6, wherein m is preferably equal to 1.

8. The polyurea according to claim 1, wherein each of the $Ar_1$, $Ar_2$ and $Ar_3$ groups bears one, two, three or four groups of formula —$S_X$—R.

9. The polyurea according to claim 8, wherein each of the $Ar_1$, $Ar_2$ and $Ar_3$ groups bears two groups of formula —$S_X$—R.

10. The polyurea according to claim 9, wherein the two groups of formula —$S_X$—R are in the meta position with respect to one another on the phenylene nucleus.

11. The polyurea according to claim 1, wherein x is within a range from 1 to 4.

12. The polyurea according to claim 11, wherein x is equal to 1 or 2.

13. The polyurea according to claim 1, wherein R is an alkyl.

14. The polyurea according to claim 13, wherein R is an alkyl having from 1 to 5 carbon atoms.

15. The polyurea according to claim 14, wherein R represents a methyl or an ethyl.

16. The polyurea according to claim 15, wherein R is a methyl.

17. The polyurea according to claim 1, wherein the phenylenediamino —HN—$Ar_1$—NH—, —HN—$Ar_2$—NH— and —HN—$Ar_3$—NH— strings, which are identical or different, correspond to either of formulae (III-a) and (III-b):

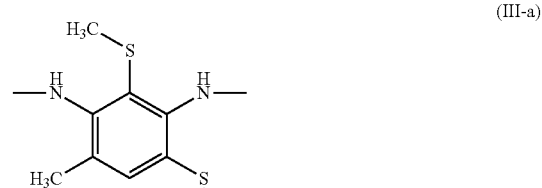

(III-a)

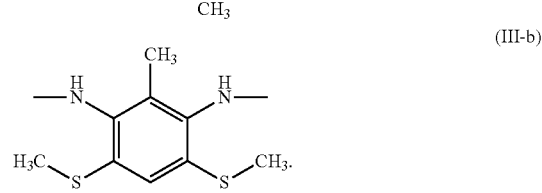

(III-b)

18. The polyurea according to claim 1, wherein the sulfur-comprising polyaromatic polyamine units having a sub-unit of formula (I) and the base structural units having urea —NH—CO—NH— units are connected to one another according to a sub-unit corresponding to the formula:

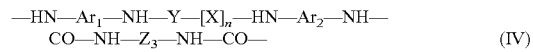

(IV)

wherein $Ar_1$, $Ar_2$, X, n, m and $Z_1$ are as defined above;
wherein Y represents the string:

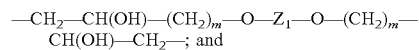

wherein $Z_3$ represents an aliphatic, cycloaliphatic or aromatic divalent bonding group.

19. The polyurea according to claim 18, wherein the aliphatic group comprises from 1 to 30 carbon atoms, the cycloaliphatic group comprises from 3 to 30 carbon atoms, and the aromatic group comprises from 6 to 30 carbon atoms.

20. An adhesion primer for the adhesive bonding of a substrate to an unsaturated rubber comprising the polyurea according to claim 1.

21. The adhesion primer according to claim 20, wherein the substrate is a substrate having at least a surface comprising glass or metal.

22. A corrosion-resistant protective coating for a substrate having at least the surface being at least partially metallic comprising the polyurea of claim 1.

23. A substrate coated, at least in part, with a polyurea according to claim 1.

24. The substrate according to claim 23, wherein the substrate is made of glass or metal.

25. A metal reinforcer coated with a polyurea according to claim 1.

26. A metal reinforcer in the form of a thread, cord, film or plate, at least a portion of the surface of which is made of brass-coated steel, wherein the brass-coated steel is coated with a polyurea according to claim 1.

* * * * *